US00RE36206E

United States Patent [19]

Borneby

[11] E Patent Number: Re. 36,206

[45] Reissued Date of Patent: May 4, 1999

[54] EXPANDABLE GASKET, SEALED JOINT AND METHOD OF FORMING SAME

[75] Inventor: Hans G. Borneby, Niota, Tenn.

[73] Assignee: Indian Head Industries, Charlotte, N.C.

[21] Appl. No.: 08/911,545

[22] Filed: Aug. 14, 1997

Related U.S. Patent Documents

Reissue of:

[64] Patent No.: 5,531,454
Issued: Jul. 2, 1996
Appl. No.: 08/365,705
Filed: Dec. 29, 1994

[51] Int. Cl.[6] ..... F16J 9/00; F16J 15/10; F16L 17/00

[52] U.S. Cl. ..... 277/627; 277/650; 277/931; 277/938; 285/335; 285/363; 428/913

[58] Field of Search ..... 277/608, 627, 277/597, 650, 936, 938, 931; 428/283, 913; 285/109, 187, 335, 363, 374, 381, 910

[56] References Cited

U.S. PATENT DOCUMENTS 4,642,201 2/1987 Vogel .
4,756,561 7/1988 Kawata et al. .
4,795,166 1/1989 Irmler .
4,799,956 1/1989 Vogel .
4,813,687 3/1989 Nakayama et al. .
5,172,920 12/1992 Schlenk .
5,176,863 1/1993 Howard .
5,384,188 1/1995 Lebold et al. .
5,443,894 8/1995 Pollock et al. .

*Primary Examiner*—Anthony Knight
*Assistant Examiner*—John L. Beres
*Attorney, Agent, or Firm*—Howard & Howard

[57] ABSTRACT

An improved expandable gasket, sealed joint and method of forming a sealed joint which includes a gasket having at least 5% by weight unexpanded or unexfoliated graphite. The graphite material is preferably a mixture of expanded and unexpanded graphite compressed in a sheet or other shape affixed to a metal plate. The preferred composition is 5 to 70% by weight of unexpanded graphite and 30 to 95% expanded graphite, wherein the percentage of unexpanded graphite is controlled to provide the desired gasket expansion. A more preferred composition includes at least 10% by weight unexfoliated graphite or more preferably 15 to 50% by weight. The gasket is placed between the surfaces to be sealed and clamped in place. When the joint is heated, the unexpanded graphite exfoliates, causing the gasket to swell or expand, tightly sealing the joint. The expandable gasket of this invention is particularly suitable for automotive application, including head and exhaust gaskets which are subject to temperatures exceeding about 400° C.

23 Claims, 1 Drawing Sheet

EXPANDABLE GASKET, SEALED JOINT AND METHOD OF FORMING SAME

Matter enclosed in heavy brackets [ ] appears in the original patent but forms no part of this reissue specification; matter printed in italics indicates the additions made by reissue.

BACKGROUND OF THE INVENTION

This invention relates to an improved expandable graphite gasket containing unexpanded or unexfoliated graphite which may be formed by mixing expanded and unexpanded graphite flakes and compressing the graphite material into a sheet or other shape as required by the joint. The gasket of this invention is particularly useful for forming sealed joints subject to pressure and heat, such as head and exhaust gaskets, which causes the gasket to expand and tightly seal the joint.

A conventional automotive gasket generally includes a graphite or paper lamina which is adhesively bonded or mechanically affixed to a steel core or metal plate. The most preferred automotive gaskets includes a metal plate having a plurality of spaced tangs struck from the plate, extending from the plane of the plate or core into the gasket material. All gaskets are subject to creep or extrusion of the gasket material during compression of the gasket by bolts or the like. Where tangs are not used, the gasket material will extrude laterally under pressure, reducing the torque retention of the gasket, thus causing leakage and reducing the life of the gasket. The tangs struck from the metal plate form "columns" between the opposed surfaces of the gasket, reducing lateral extrusion of the gasket material. The gasket material may be applied to one or both sides of the metal sheet or the gasket may be a laminate of several layers or laminae of metal and graphite or paper sheets. Generally, graphite sheets, when used alone, have too much creep for most automotive applications and thus the preferred gaskets include a metal plate or core.

Graphite gaskets are presently used by the automotive industry for exhaust and head gaskets, exhaust and intake manifolds, and the like. Graphite is a crystalline allotropic form of carbon. Graphite occurs naturally and is mined in several locations throughout the world, including for example, Madagascar, Mexico and China. Graphite is also produced synthetically by heating petroleum coke to approximately 3,000° C. in an electronic furnace. Approximately 70% of the graphite presently used in the United States is synthetic. The naturally occurring graphite is processed by heating the graphite particulate or flakes to a temperature above the exfoliation temperature of the graphite (above about 300° C.) which causes the graphite to "exfoliate" or separate and expand to several times their original thickness. The expanded or exfoliated flakes are then blown onto a conveyor, washed with a mild acid and compressed into sheets of various thicknesses. The sheets are then cut to size and used for various applications including gaskets, as described above.

A principle concern or problem with any gasket is potential leakage. Leakage may result from several sources including, for example, insufficient compression of the gasket or creep, as described above, and gaps or imperfections in the mating surfaces to be sealed. Further, automotive gaskets, for example, are subject to extreme variations in temperature. An automotive exhaust gasket, for example, is heated by the vehicle exhaust gases, which heat the gasket to temperatures greater than 400° C., causing the gasket to expand. When the engine is "cold", however, the gasket tends to shrink, potentially resulting in leakage around the gasket. The gasket is also subject to creep, which is reduced by the use of tangs, as described above. Automotive manufacturers generally overtorque the bolts which secure the gasket between the mating surfaces about 10%, sometimes causing distortion, particularly around the bolts. Further, the surfaces to be sealed and the gasket are not perfectly matched and planar, particularly on a microscopic level. Generally, therefore, there are gaps and imperfections which may cause leakage. There is, therefore, a need for a gasket, particularly in automotive applications, which does not require overtorquing and which fills gaps and imperfections in the mating surfaces of the joint. The expandable gasket of this invention accomplishes these purposes.

The fact that naturally occurring graphite flakes exfoliate or expand several times their original size has been known for many years. More recently, [Union Carbide Corporation] *Ucar Carbon Technology Corporation* has developed a use for sheets of graphite containing unexfoliated graphite in wall *and floor* coverings [and ceiling tiles] as a flame retardant. When the expandable graphite layer is exposed to extreme heat, such as a fire, the expandable graphite exfoliates, [absorbs oxygen and extinguishes the fire] *thereby reducing the thermal conductivity of the material, which then functions as a fire retardant material as disclosed in U.S. Pat. No. 5,176,863.* Such material is available from UCAR Carbon Company, Inc. of Parma, Ohio. The advantages of the use of unexpanded or unexfoliated graphite has not, however, been suggested or recognized as a gasket material.

SUMMARY OF THE INVENTION

The present invention relates to an improved expandable graphite gasket which includes unexpanded or unexfoliated graphite flakes. Upon heating, the unexfoliated graphite flakes separate and expand to several times their original thickness, causing the gasket to expand and fill in gaps and imperfections in the surfaces to be sealed and the gasket. Further, as described above, the expandable graphite gasket of this invention could eliminate the requirement for overtorquing head and exhaust gaskets; however, the gasket may also be made of a thinner material and rely upon the expansion for complete sealing.

Thus, the method of forming a sealed joint subject to pressure and heat having opposed surfaces to be sealed includes forming a gasket comprised of loosely packed *fibrous* material including at least 5% by weight unexpanded graphite by forming and compressing the material into a shape configured to be received between the opposed surfaces of the joint; then locating the gasket between the opposed surfaces and clamping the gasket in place between the opposed surfaces, forming the joint. Then, upon heating the gasket in the joint above the exfoliation temperature of the unexpanded graphite, the gasket tends to expand and tightly seal the joint. The gasket material is preferably formed and compressed into a sheet and the gasket is then formed into the desired configuration to be received between the surfaces of the joint. In a typical application, the method includes cutting a plurality of openings through the sheet to receive bolts, then locating the sheet between the surfaces to be sealed, clamping the surfaces by tightening or torquing the bolts, then beating the gasket above the exfoliation temperature of the unexapanded graphite, as described above. The gasket may also be formed into a contoured shape configured to be received between contoured surfaces of the surfaces to be sealed.

In the preferred method of this invention, the gasket is formed by forming and compressing a mixture of expanded or exfoliated graphite and unexpanded or unexfoliated graphite, wherein the expanded graphite comprises 5 to 70% by weight of the gasket material or more preferably 10 to 60% by weight. Most preferably, the gasket includes greater than 15% by weight unexpanded graphite or 15 to 50% by weight. As described above, the percentage of the unexpanded graphite in the gasket material may be adjusted for a particular application, including the amount of expansion desired, the joint to be sealed and the remainder of the gasket material; however, the gasket material should preferably include at least about 10% by weight of unexpanded or unexfoliated graphite. In the most preferred embodiment, wherein the graphite material consists essentially of expanded and unexpanded graphite, the graphite material comprises 15 to 50% by weight unexpanded graphite flakes and 50 to 85% expanded graphite. In some applications, the graphite gasket should include at least 20% by weight unexpanded graphite or 20 to 40% by weight. As used in this disclosure, unexpanded or unexfoliated graphite refers to naturally occurring graphite which has not been heated above the exfoliation temperature of graphite. The expanded graphite may be naturally occurring exfoliated graphite or synthetically produced graphite, but natural graphite is preferred for most automotive applications.

Further, in most automotive applications, including, for example, exhaust and head gaskets, exhaust and intake manifolds, and the like, the expandable graphite gasket of this invention includes one or more layers of metal or a metal core. In a typical application, the metal plate is tin plated steel having a thickness of 0.006 to 0.008" and the gasket layer will be about 0.02". The gasket may comprise a metal core having gasket material affixed on one or both sides or a laminate comprising several alternative layers or laminae of metal plates and gasket material. In the most preferred embodiment, the metal core or plates include a plurality of integral tangs which are struck from the plate and extend from the plane of the plate, wherein the tangs extend into the gasket sheet, affixing the gasket sheet to the metal plate and providing columnar support for the gasket, as described above.

The expandable graphite gasket, sealed joint and method of forming a sealed joint of this invention solves several important problems associated with the prior art gaskets, particularly in automotive applications. Upon exposure to heat above the exfoliating temperature of the expandable graphite, the gasket expands to fill in imperfections and gaps in the surfaces to be sealed, reduces the requirement for overtorquing and reduces loss of torque. Further, the expandable graphite gasket of this invention reduces costs, because the gasket laminas need not be as thick to achieve the same sealability as prior gaskets. Other advantages and meritorious features of this invention will be more fully understood from the following description of the preferred embodiments, the appended claims and the drawings, a brief description follows.

DESCRIPTION OF THE PREFERRED EMBODIMENTS OF THE INVENTION

As described above, the expandable gasket of this invention is particularly suitable for sealing joints, including automotive exhaust and head gaskets, exhaust and intake manifolds, and the like, which are subject to fluid pressure and heat above the exfoliation temperature of naturally occurring graphite flakes or greater than about 300° C. In this environment, the unexpanded graphite flakes in the expandable gasket of this invention exfoliate or separate violently, causing the gasket to expand, thereby creating an outward pressure which minimizes torque loss and fills in gaps or imperfections in the surfaces sealed by the gasket. As will be understood, the shape and configuration of the gasket will thus be dictated by the application, particularly the surfaces to be sealed.

Figure 1:
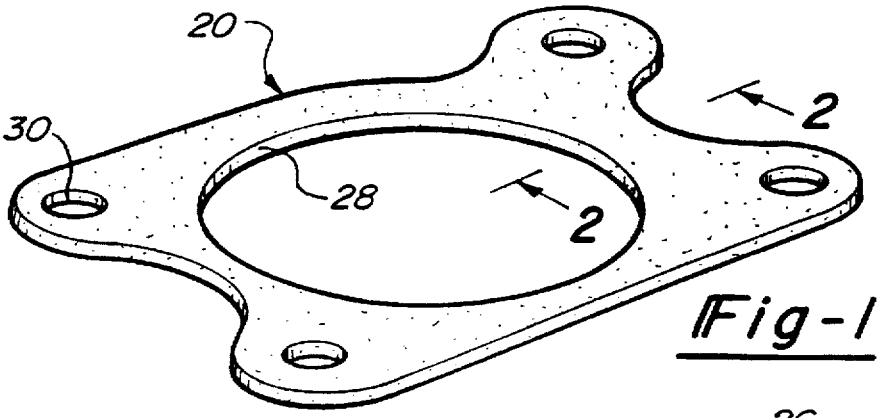
FIG. 1 is a top perspective view of one embodiment of the expandable graphite gasket of this invention.
Figure 2:
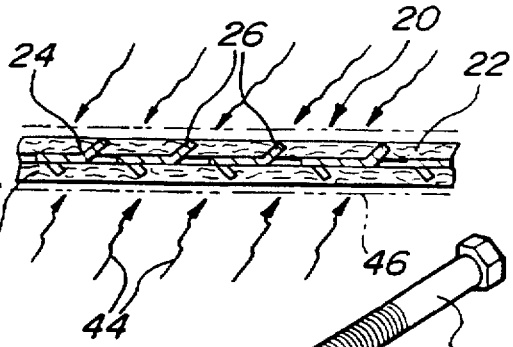
FIG. 2 is a cross sectional view of the expandable gasket embodiment shown in FIG. 1, in the direction of view arrows 2—2.

FIGS. 1 and 2 illustrate a preferred embodiment of the expandable graphite gasket 20 of this invention. The disclosed embodiment of the gasket 20 includes layers or lamina of expandable gasket material 22 and a metal plate or lamina 24. In this embodiment, the expandable gasket layers 22 are mechanically affixed to the metal lamina 24 by integrally struck tangs 26 which extend into the gasket material 22. As described above, the tangs 26 not only retain the gasket material 22, but also provide columnar support for the gasket. That is, the tangs reduce lateral extrusion of the gasket when the gasket is compressed in the installation. The tangs may be generally triangular in form having a pointed end and are driven into the gasket material during formation of the gasket. In a typical application, the metal plate 24 is tin plated steel having a thickness of about 0.006 to 0.008" and the gasket material laminas have a thickness of about 0.020".

Figure 3:
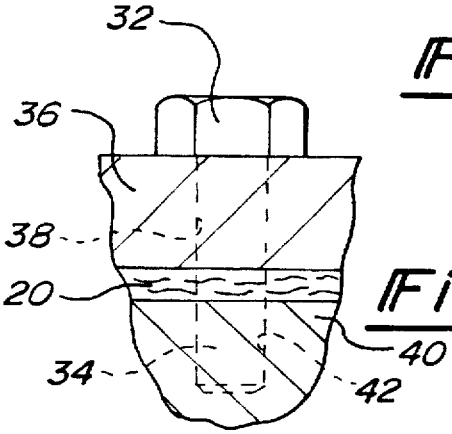
FIG. 3 is a side cross sectional view of the expandable gasket shown in FIGS. 1 and 2 clamped in a sealed joint.

In the embodiment of the gasket shown in FIG. 1, the gasket includes a central port or opening 28 which receives hot gas having a temperature greater than the exfoliation temperature of the unexpanded graphite and the gasket includes a plurality of bolt openings 30 which receive the threaded shank portion 34 of bolts 32 used to torque the mating parts of the sealed joint and compress the gasket 20, as shown in FIG. 3. In this embodiment, the shank portion 34 of the bolt 32 is received through an opening 38 in plate 36, through opening 30 in the gasket into a tapped hole 42 in the block 40 and threaded or torqued to provide a tight seal. In a typical automotive application, the bolt is threaded into the tapped bore 42 by a torque wrench which is generally set to overtorque the bolt by approximately 10%, as described above.

As described herein, the expandable gasket of this invention includes unexpanded or unexfoliated graphite. Naturally occurring graphite is a crystalline allotropic form of carbon. Upon heating graphite above its exfoliating temperature, the unexpanded graphite flakes violently expand and separate, causing the gasket to expand, creating an outward pressure which improves the sealing ability of the gasket, reduces torque loss and fills gaps and imperfections in the mating surfaces of the joint. As will be understood, the percentage of unexfoliated graphite flakes in the gasket will depend upon several factors, including the materials used in the gasket, the preferred amount of expansion, the gasket design and the surfaces to be sealed;

however, in most applications, the gasket should include at least 5% by weight unexfoliated graphite or more preferably greater than 10 to 15% by weight. In the most preferred embodiment of the expandable gasket of this invention, the gasket is formed by mixing exfoliated and unexfoliated graphite and compressing the mixture into the desired shape necessary to seal the joint. It is believed, however, that the percentage of unexpanded graphite in the gasket should range from 5 to 70%. In most applications, however, the unexpanded graphite in the gasket should be at least 10% by weight or range from about 10 to 60%. In automotive applications, such as intake and exhaust manifolds, the unexfoliated or unexpanded graphite should range from about 15 to 50% by weight. As described below, an expandable graphite gasket comprising about 20% by weight unexpanded graphite and about 80% by weight expanded graphite has been found to be particularly useful as a gasket in exhaust manifolds.

The embodiment of the gasket shown in FIGS. 1 to 3 was formed by forming and compressing a mixture of expanded or exfoliated graphite and unexfoliated graphite into planar sheets, then affixing the sheets of graphite 22 to the metal core 24. Gasket sheets 22 are affixed to the core by compressing the gasket sheets 22 against the core, which drives the tangs 26 into the soft gasket material 22, permanently attaching the gasket material to the metal core. The gasket sheets 22 may also be adhesively bonded to a planar metal core (not shown) on one or both sides of the metal core and the gasket may comprise several layers of expandable gasket material and metal plates.

When the expandable gasket 20 shown in FIGS. 1 to 3 is heated above the exfoliating temperature of the expandable graphite, as shown by arrows 44 in FIG. 2, the unexfoliated graphite flakes will separate and expand, creating an outward pressure in the gasket. If the gasket 20 is not fully contained, the gasket will expand, as shown by phantom lines 46. As will be understood, the percentage of expansion of the gasket 20 will depend upon the percentage of unexfoliated graphite in the gasket. However, where the gasket 20 is clamped and compressed as shown in FIG. 3, the expansion of the gasket will be very limited, including expansion into gaps and imperfections in the mating surfaces of the plate 36 and the block 40. Nevertheless, the exfoliating graphite flakes will create an outward pressure which reduces loss of torque and improves the seal between the plate 36 and the block 40 as evidenced by the testing described hereinbelow.

Figure 4:
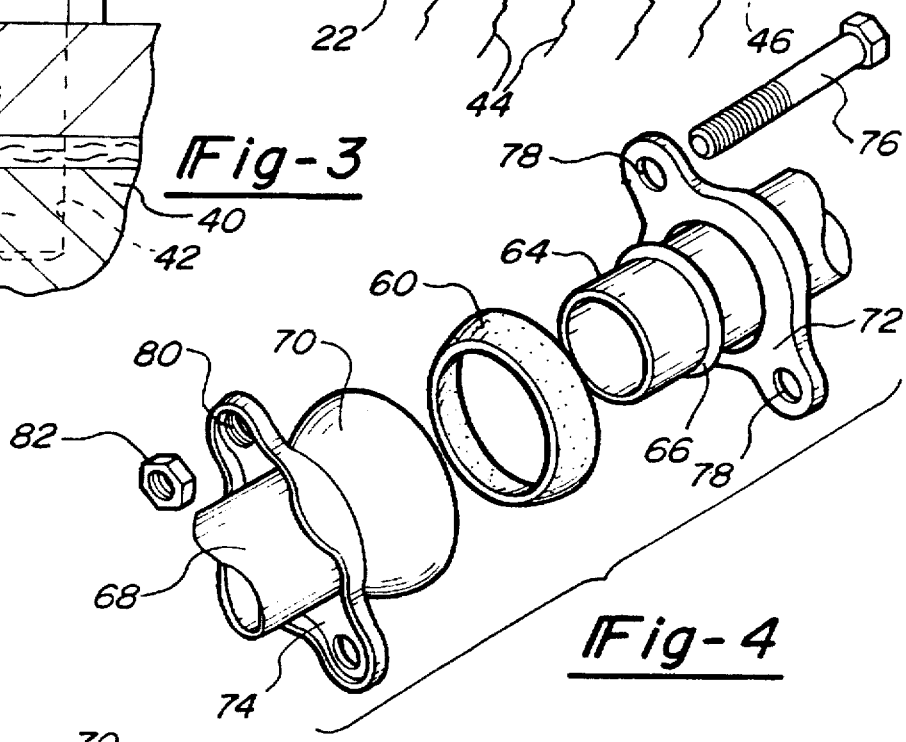
FIG. 4 is an exploded view of an alternative embodiment of a sealed joint having a contoured gasket.
Figure 5:
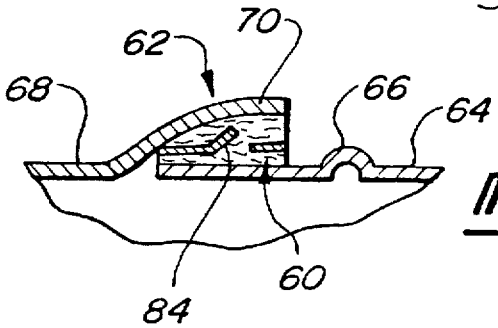
FIG. 5 is a partial side cross sectional view of the sealed joint shown in FIG. 4 following assembly.

FIGS. 4 and 5 illustrate an alternative embodiment of the expandable graphite gasket 60 and sealed joint 62, which is typical of an automotive exhaust joint. The expandable graphite gasket 60 has been formed into a contoured shape, which in this embodiment is an arcuate or curved frustoconical shape configured to be received between the mating surfaces of the joint 62, as shown in FIG. 5. The disclosed embodiment of the joint includes the cylindrical tube or pipe member 64 having an retaining ring portion 66, a pipe 68 having a bell-shaped portion 70, collars 72 and 74 and threaded bolts 76 which are received through openings 78 and 80 in the wing portions of the collars 72 and 74, respectively, and secured by nuts 82. When the joint or coupling is assembled and the bolts 76 are torqued in the nuts 82, the gasket 60 is tightly clamped between the mating surfaces of the bell-shaped portion 70 of the pipe 68 and the end of the pipe 64, as shown in FIG. 5. The expandable graphite gasket 60 may also include a metal core 84, as described above. This embodiment of the gasket 60 may be formed into the desired contoured shape around the core 84 or the gasket material or the gasket may be first formed into flat sheets, affixed to the core and then shaped by compressing the softer gasket material. As described above, the gasket material includes expandable graphite, such that the graphite flakes will separate and expand when the gasket is heated above the exfoliating temperature of the graphite. In a typical application of the expandable graphite gasket of this invention in an automotive exhaust coupling as shown in FIGS. 4 and 5, the temperatures of the exhaust gasses transmitted through the pipes 64 and 68 exceeds 400° C., which is above the exfoliating temperature of the expandable graphite flakes.

Table 1, below, summarizes the results of leak testing of exhaust manifold similar to FIGS. 1 to 3 under simulated automotive conditions. Five gasket systems were evaluated. All of the gaskets tested included a metal core which was faced on both sides with graphite gasket material, as described above. The gaskets used in these tests was similar to the gasket shown in FIG. 3, wherein one of the openings was closed or sealed and the system was pressurized with nitrogen gas and the assembly was heated in an electric furnace to greater than 400° C. to simulate the internal heating by the exhaust gasses. The assembly was then cooled, pressurized with nitrogen gas and the mass flow rate was measured to determine leakage.

In the first test, Test No. 1 in Table 1, the thickness of the gasket material layers was measured at 0.020", forming a gasket having a combined thickness, including the core, of 0.045". The gasket was a conventional gasket taken from the assembly line of the assignee and the gasket material comprised expanded or exfoliated graphite. As shown in Table 1, below, the leakage rate through the gasket exceeded 5,000 ml/min. which exceeded the measuring capability in the test. The sealing capability of the graphite gasket was not dependent upon temperature.

In Test No. 2 recorded in Table 1, below, the gasket was similar to the gasket tested in Test No. 1, except that the gasket layers included about 10% of unexfoliated graphite. That is, the graphite layers had a thickness of 0.020" and the combined thickness of the gasket was 0.05". No improvement was found when the assembly was heated to 305° C., which heated the manifold to 274° C.; however, when the manifold was heated to 417° C. (manifold temperature 332° C.), the leakage was reduced to 3,740 ml/min.

The gasket in Test No. 3 was similar to the gaskets tested in Test No. 1 and 2, except that the graphite gasket layers included about 20% by weight of unexfoliated graphite. A dramatic improvement was found when the furnace temperature was increased to 337° C. (manifold temperature 253° C.), wherein the leakage rate was 1,330 ml/min. and when the furnace temperature was increased to 429° C. (manifold temperature 366.6° C.) and 497° C. (manifold temperature 445° C.), the leakage was reduced to 236 and 123 ml/min., respectively. Thus, a very dramatic improvement was found when the gasket material included 20% unexfoliated carbon.

Test No. 4 was again a conventional gasket; however, the thickness of the gasket material was increased to 0.025", resulting in a combined gasket thickness of 0.065". The gasket did show some improved sealing when the manifold was heated to a temperature above 344° C.; however, its improvement apparently resulted from the increased thickness of the gasket.

A dramatic improvement was, however, found in Test No. 5, where the gasket material included 20% by weight unexfoliated or expandable graphite. The gasket material had a thickness of 0.035" and the overall thickness of the gasket was 0.070". As shown in Table No. 1, the leakage through the gasket exceeded the measurable rate in this test until the manifold and gasket was heated to 311° C. and cooled, which resulted in a drop from greater than 5,000 ml/min. to 56.4 ml/min. When the gasket was heated to 375° C., the leakage dropped to less than 0.1 ml/min. and no leakage was measurable when the temperature was increased to 440° C. The dramatic improvement in the sealability of the gasket resulted from the exfoliation of the unexpanded carbon in the gasket, which caused the gasket to expand and seal the joint, although the gasket was clamped in the normal manner by torquing the bolts prior to testing.

TABLE 1

| | | | | |
|---|---|---|---|---|
| Test #1, 0.20" GTC | 0 | 21.0 | 21.2 | >5000 |
| Gasket Thickness = 0.45" | 10 | 124.0 | 59.4 | >5000 |
| After assembty cooled leak | 20 | 236.0 | 140.0 | >5000 |
| rate was > 5000 ml/min. | 30 | 296.0 | 216.0 | >5000 |
| | 40 | 409.0 | 331.0 | >5000 |
| | 50 | 464.0 | 400.0 | >5000 |
| Test #2, 0.30" EG 10% | 0 | 21.0 | 21.2 | >5000 |
| Gasket Thickness = .045" | 10 | 110.0 | 50.5 | >5000 |
| After assembly cooled leak | 20 | 244.0 | 131.0 | >5000 |
| rate was > 5000 ml/min. | 30 | 305.0 | 274.0 | >5000 |
| | 40 | 417.0 | 332.0 | 3740.0 |
| Test #3, 0.20" EG 20% | 0 | 21.0 | 21.2 | >5000 |
| Gasket Thickness = .045" | 10 | 97.0 | 60.5 | >5000 |
| After assembly cooled leak | 20 | 263.0 | 151.0 | >5000 |
| rate was 283.0 ml/min. | 30 | 337.0 | 253.0 | 1330.0 |
| | 40 | 429.0 | 366.6 | 236.0 |
| | 50 | 497.0 | 445.0 | 123.0 |
| Test #4, 0.25 GTC | 0 | 22.0 | 23.0 | >5000 |
| Gasket Thickness = 0.65" | 10 | 102.0 | 49.0 | >5000 |
| After assembly cooled leak | 20 | 248.0 | 141.0 | >5000 |
| rate was > 5000 ml/min. | 30 | 315.0 | 230.0 | >5000 |
| | 40 | 419.0 | 344.0 | 2895.0 |
| | 50 | 466.0 | 400.0 | 1495.0 |
| Test #5, 0.35" 20% EG | 0 | 22.0 | 21.6 | >5000 |
| Gasket Thickness = .070" | 10 | 85.0 | 44.4 | >5000 |
| After assembly cooled leak | 20 | 232.0 | 125.0 | >5000 |
| rate was 14.4 ml/min. | 30 | 300.0 | 207.0 | >5000 |
| | 40 | 317.0 | 311.0 | 56.4 |
| | 50 | 451.0 | 375.0 | −0.1 |
| | 60 | 512.0 | 440.0 | .0 |

The method of forming a sealed joint of this invention thus includes forming a gasket comprised of loosely packed material, preferably a mixture of expanded and unexpanded graphite, including at least 5% unexpanded graphite, by forming and compressing said material into a shape configured to be received between the opposed surfaces of the joint to be formed. The gasket is then located between the opposed surfaces and clamped in place, forming the joint. Finally, the method of this invention includes heating the gasket above the exfoliation temperature of the unexpanded graphite to expand the graphite and tightly seal the joint. In many applications, the graphite material is first formed and compressed into a sheet and the sheet is then configured to be received between the surfaces of the joint. In such applications, this may include cutting openings through the sheet configured to receive bolts, as shown in FIGS. 1 to 3, then locating the gasket between the surfaces of the joint and clamping the gasket by torquing the bolts, as described. Alternatively, the method of this invention includes forming the sheet into a contoured shape to be received between the contoured surfaces of the joint.

In the most preferred embodiment of the expandable graphite gasket of this invention, the gasket includes a metal core having a plurality of spaced tangs struck from the core, as described above. The method then includes piercing a plurality of tangs from the metal core, then affixing the graphite material to the core by driving the tangs into the graphite sheet.

As described above, the expandable graphite gaskets, sealed joint and method of this invention results in an improved gasket and sealed joint which reduces loss of torque, results in improved sealing and reduces the requirement for overtorquing the clamping bolts. Having described the invention, it will be understood by those skilled in the art that various modifications may be made to the disclosed improved expandable graphite gasket within the purview of the appended claims. For example, as described above, the shape and configuration of the gasket will depend upon the application of the gasket. Further, although the preferred embodiment of the gasket includes a metal core, the gasket may be used without a metal core or affixed to the metal core by any suitable means, including bonding.

I claim:

1. A heat expandable graphite gasket for sealing a joint subject to fluid pressure and heat, said gasket comprising:

a compressed mixture of expanded and unexpanded graphite containing at least 5% by weight unexpanded graphite flakes and said mixture compressed in the form of a gasket and said gasket expandable under pressure when heated to the exfoliation temperature of said unexpanded graphite flakes.

2. The heat expandable graphite gasket defined in claim 1, characterized in that said [sheet] *gasket* comprises at least 5 to 70% by weight unexpanded graphite.

3. The heat expandable graphite gasket defined in claim 1, characterized in that said gasket [sheet] consists essentially of 10 to 60% by weight unexpanded graphite and about 40 to 90% by weight expanded graphite.

4. The heat expandable graphite gasket defined in claim 3, characterized in that the concentration of unexpanded graphite in said gasket [sheet] is 15 to 50% by weight.

5. The heat expandable graphite gasket defined in claim 1, characterized in that said graphite [mixture] *gasket* is affixed to a metal plate which includes a plurality of integral tangs struck from said metal plate and extending generally transverse to the plane of said plate, said tangs extending into said graphite gasket material affixing said gasket material to said metal plate and providing column support for said gasket.

6. A heat expandable graphite gasket for sealing a joint [subject to pressure and heat], said gasket comprising [a uniform mixture of] expanded and unexpanded graphite containing at least 10% by weight unexpanded graphite flakes and said [mixture] *gasket* compressed in a shape configured to be received in a joint and said gasket expandable under pressure when heated to the exfoliation temperature of said unexpanded graphite flakes *to seal a joint including said expandable gasket.*

7. The heat expandable graphite gasket defined in claim 6, characterized in that said graphite gasket is affixed to a metal plate.

8. The heat expandable graphite gasket defined in claim 6, wherein said *expandable* gasket [mixture] comprises at least 50 to 85% by weight of expanded graphite.

9. The heat expandable graphite gasket defined in claim 8, wherein said [sheet] *gasket* consists essentially of 15 to 50% by weight unexpanded graphite and 50 to 85% by weight expanded graphite.

10. The heat expandable graphite gasket defined in claim 8, characterized in that the concentration of unexpanded graphite in said [sheet] *gasket* is 20 to 30% by weight.

11. The heat expandable graphite gasket defined in claim 6, wherein said graphite is affixed to a metal plate, said metal plate including a plurality of integral tangs struck from said plate and extending from the plane of said plate, said tangs extending into said graphite gasket, affixing said graphite gasket to said metal plate and providing columnar support for said gasket.

12. A joint subject to fluid pressure and heat, said joint including opposed surfaces to be sealed and a heat expandable graphite gasket located between said surfaces, said gasket comprising a compressed shape of generally fibrous material including at least 10% by weight unexpanded graphite, and said gasket clamped between said opposed surfaces, said unexpanded graphite exfoliating upon heating of said gasket above the exfoliating temperature of said expandable graphite, sealing said joint.

13. The joint defined in claim [11] *12*, characterized in that said gasket comprises a [mixture] *sheet* of expanded and unexpanded graphite comprising 10 to 60% by weight unexpanded graphite and 40 to 90% by weight expanded graphite.

14. The joint defined in claim 12, characterized in that said gasket consists essentially of [a mixture of] 10 to 60% by weight unexpanded graphite and 40 to 90% by weight expanded graphite.

15. The joint defined in claim [11] *12*, characterized in that said compressed gasket [sheet] is affixed to a metal plate.

*16. The heat expandable graphite gasket defined in claim 1, wherein said graphite gasket comprises a mixture of expanded and unexpanded graphite flakes uniformly distributed throughout said gasket.*

*17. The joint defined in claim 12, wherein a fluid transmitted through said joint has a temperature greater than the exfoliation temperature of said unexpanded graphite, thereby heating and exfoliating said unexpanded graphite and sealing said joint.*

*18. A heat sealable joint, said joint including opposed surfaces to be sealed and a heat expandable gasket located between said joint surfaces, said gasket comprising exfoliated graphite and at least 5% by weight unexfoliated graphite compressed in a shape generally conforming to said opposed surfaces of said joint, and said unexfoliated graphite in said gasket exfoliating upon heating and said gasket expanding to seal said opposed surfaces of said joint.*

*19. The heat sealable joint defined in claim 18, wherein said unexfoliated graphite in said gasket comprises 5 to 70% by weight of said gasket.*

*20. The heat sealable joint defined in claim 18, wherein said unexfoliated graphite in said gasket comprises 15 to 50% by weight of said gasket.*

*21. A heat sealable joint between two tubes aligned to communicate for transmitting fluid, said joint including opposed surfaces for sealing the communication between said tubes, and a heat expandable gasket located between said joint surfaces, said gasket comprising exfoliated graphite and 15 to 50% by weight unexfoliated graphite material compressed and shaped to generally conform to said opposed surfaces of said joint, said unexfoliated graphite in said gasket exfoliating and expanding upon heating of said gasket above the exfoliating temperature of said unexfoliated graphite, causing said gasket to expand and seal said opposed surfaces of said joint and said communication between said tubes.*

*22. A heat expandable graphite gasket for sealing a joint subject to fluid pressure, said gasket comprising:*

*a compressed shape of expanded and unexpanded graphite containing at least 5% by weight unexpanded graphite flakes and said shape compressed in the form of a gasket and said gasket expandable under pressure when heated to the exfoliation temperature of said unexpanded graphite flakes to seal a joint containing said gasket.*

*23. A heat sealable joint, said joint including opposed surfaces to be sealed and a heat expandable graphite gasket located between said surfaces, said gasket comprising a compressed shape of generally fibrous material including at least 10% by weight unexpanded graphite, and said gasket clamped between said opposed surfaces, said unexpanded graphite exfoliating upon heating of said gasket above the exfoliation temperature of said exapandable graphite, sealing said joint.*

* * * * *